UNITED STATES PATENT OFFICE.

THOMAS A. WILSON, OF LODI, CALIFORNIA.

COMPOSITION FOR AGUE.

SPECIFICATION forming part of Letters Patent No. 287,602, dated October 30, 1883.

Application filed March 31, 1883. (Specimens.)

*To all whom it may concern:*

Be it known that I, THOMAS A. WILSON, a citizen of the United States, residing at Lodi, in the county of San Joaquin and State of California, have invented a certain new and useful Medical Compound for the Treatment Ague, of which the following is a specification.

The said medical compound consists of the following ingredients combined in the proportions stated, viz: pure water, twenty-five gallons; whisky, ten gallons; fluid extract Jamaica ginger, one pint; calabazilla root, twenty pounds. The latter ingredient is first thoroughly steeped in and its strength extracted by boiling in the quantity of water above mentioned. The liquid solution thus obtained is then filtered and clarified and permitted to cool. Then the quantities of whisky and fluid extract of Jamaica ginger above mentioned are added, and the whole thoroughly mixed and mingled by agitation, and the product immediately bottled for sale and use, the corks of the vials and bottles being hermetically sealed.

The calabazilla-root is a native of Arizona and New Mexico, and is known also as wild squash or wild pumpkins.

By the use of this compound in accordance with directions—to wit, for adults one teaspoonful at night, to be taken in a small quantity of sugar and water. If the bowels are not moved by morning, repeat the dose once a day until they are moved. After that takes place take ten or twenty drops twice a day for three or four days. For children one-half the above quantity to be taken in a small quantity of water and sugar. If the effect be griping, or the evacuation of the bowels be too severe, moderate the dose. By this treatment the ague and like malarial disorders of the human system are usually speedily cured and prevented.

What I claim, and desire to secure by Letters Patent of the United States, is—

The herein-described medical compound for the treatment of ague, consisting of pure water, whisky, fluid extract of Jamaica ginger, and calabazilla-root or wild squash in the proportions specified.

In testimony whereof I affix my signature in presence of two witnesses.

THOS. A. WILSON.

Witnesses:
 JOSHUA B. WEBSTER,
 ELIHU B. STOWE.